(12) United States Patent
Sabatini et al.

(10) Patent No.: US 12,145,091 B2
(45) Date of Patent: Nov. 19, 2024

(54) COMPOSITE FILTERING MEDIUM AND METHOD FOR PRODUCTION THEREOF

(71) Applicant: SAATI S.P.A., Appiano Gentile (IT)

(72) Inventors: Valentina Sabatini, Appiano Gentile (IT); Martina Simone, Appiano Gentile (IT); Carmine Lucignano, Appiano Gentile (IT); Paolo Canonico, Appiano Gentile (IT)

(*) Notice: Subject to any disclaimer, the term of this patent is extended or adjusted under 35 U.S.C. 154(b) by 0 days.

(21) Appl. No.: 18/563,882

(22) PCT Filed: Jul. 14, 2022

(86) PCT No.: PCT/IB2022/056497
§ 371 (c)(1),
(2) Date: Nov. 23, 2023

(87) PCT Pub. No.: WO2023/007296
PCT Pub. Date: Feb. 2, 2023

(65) Prior Publication Data
US 2024/0216844 A1   Jul. 4, 2024

(30) Foreign Application Priority Data
Jul. 27, 2021   (IT) .................... 102021000019997

(51) Int. Cl.
*B01D 39/00* (2006.01)
*B01D 39/16* (2006.01)
(Continued)

(52) U.S. Cl.
CPC .... *B01D 39/1623* (2013.01); *B01D 2239/025* (2013.01); *B01D 2239/0291* (2013.01);
(Continued)

(58) Field of Classification Search
CPC .......... B01D 39/1623; B01D 2239/025; B01D 2239/0291; B01D 2239/0631;
(Continued)

(56) References Cited

U.S. PATENT DOCUMENTS

| 10,328,665 B2 | 6/2019 | Nakamura et al. |
| 2006/0137318 A1 | 6/2006 | Lim |
| 2012/0125866 A1* | 5/2012 | Fantini ...................... D01F 6/52 442/361 |

FOREIGN PATENT DOCUMENTS

| EP | 3366362 A1 | 8/2018 |
| KR | 10-2018-0007817 A | 1/2018 |

(Continued)

OTHER PUBLICATIONS

IPRP; European Patent Office; NL; Apr. 7, 2023.

*Primary Examiner* — T. Bennett McKenzie
(74) *Attorney, Agent, or Firm* — Patshegen IP; Moshe Pinchas

(57) ABSTRACT

A composite filtering medium comprising a precision fabric, of the type with weft and warp, on the surface of which nanofibres are deposited by electrospinning. A method for producing the composite filtering medium, comprising a step of electrospinning for formation of nanofibres and a subsequent step of deposition of said nanofibres on a base fabric; the method comprises injection of the material for formation of the nanofibres, dissolved in a solvent or mixture of solvents, through a nozzle in order to spread it on an electrode; the method comprising application of a difference of potential between the nozzle and an electrode; the nanofibres being formed as a result of evaporation of the solvent or mixture of solvents, due to the electrical field, and stretching of the polymer deposited on the electrode, by
(Continued)

means of the nozzle; the nanofibres thus formed being subsequently stretched and deposited on said base fabric.

5 Claims, 6 Drawing Sheets

(51) Int. Cl.
*H04R 1/02* (2006.01)
*H04R 1/08* (2006.01)

(52) U.S. Cl.
CPC ............... *B01D 2239/0631* (2013.01); *B01D 2239/0654* (2013.01); *B01D 2239/10* (2013.01); *B01D 2239/1216* (2013.01); *B01D 2239/1233* (2013.01); *B01D 2239/1258* (2013.01); *H04R 1/023* (2013.01); *H04R 1/086* (2013.01)

(58) Field of Classification Search
CPC ........ B01D 2239/0654; B01D 2239/10; B01D 2239/1216; B01D 2239/1233; B01D 2239/1258; H04R 1/023; H04R 1/086
USPC .......................................................... 55/524
See application file for complete search history.

(56) References Cited

FOREIGN PATENT DOCUMENTS

| KR | 20180007817 A | * | 1/2018 |
| WO | 2021/079283 A2 | | 4/2021 |

* cited by examiner

COMPOSITE FILTERING MEDIUM AND METHOD FOR PRODUCTION THEREOF

BACKGROUND OF THE INVENTION

The subject of the present invention is a composite filtering medium and a method for production thereof.

The present invention refers in particular to a composite filtering medium in the form of fabric for use as protective medium for electro-acoustic components, in the consumer-electronics field, such as speakers, receivers, microphones, etc.

Different fabrics are known which are used for protecting acoustic devices, with the aim of providing an adequate protection against external agents and at the same time a sufficient acoustic performance.

Conventional composite fabrics used in the sector described above, in which the meshes are coated with a layer of nanofibres, have the drawback of not being able to withstand temperatures of up to 300° C. In fact, the fibres that form the fabric tend to degrade as a result of heat and, basically, do not possess the thermal profile suited for ensuring the required performance.

A further disadvantage of prior composite materials is represented by the poor adhesion between the nanofibres and the monofilaments that form the meshes of the fabric.

SUMMARY OF THE INVENTION

The aim of the present invention is to provide a composite filtering medium that is improved as compared to the filtering media so far known and presents a higher performance.

In particular, an object of the invention is to provide a new composite fabric with filtering action for electro-acoustic components which, by presenting a filtering performance that is equivalent to or higher than that of the composite fabrics according to the prior art, will be able to withstand temperatures of even up to 300° C.

A further object of the invention is to provide a composite fabric of the type described above, capable of providing an improved adhesion between the filaments of the fabric meshes and the nanofibres of the coating, even without the use of adhesivizing additives.

Within the above aim, an object of the invention is to provide a filtering medium that will be particularly useful in the production of hearing aids and acoustic devices.

Another object of the invention is to provide a filtering medium capable of ensuring adequate features, at least similar to those of a conventional fabric, but with an improved protective capacity.

A further object of the invention is to provide a filtering medium that may ensure at the same time better acoustic performance and better characteristics of protection from intrusion of particulate.

Yet another object of the invention is to provide a filtering medium that will be able to guarantee values of air permeability and acoustic impedance at least equal to those of conventional fabrics, but with a degree of protection against intrusion of metal dust, textile dust, etc., that is better than that of a conventional fabric.

A further object of the invention is to provide a filtering medium that may advantageously be used for the protection of electro-acoustic components in the consumer-electronics field, such as speakers, receivers, microphones, etc.

Yet a further object of the invention is to provide a filtering medium that will be able to guarantee the widest possible reliability and safety in use.

These and other objects, which will become more apparent hereinafter, are achieved by a composite filtering medium and by a method for the production thereof, as specified in the appended claims.

BRIEF DESCRIPTION OF THE DRAWINGS

Further characteristics and advantages of the subject of the present invention will become more apparent from an examination of the description of a preferred, though not exclusive, embodiment of the invention, illustrated by way of indicative and non-limiting example in the attached drawings.

The base fabric has a coating of polyimide nanofibres, deposited in solution by means of an electrospinning process. Suitable solvents are DMAc (dimethyl acetamide) and NMP (N-methyl-2-pyrrolidone) in a weight ratio of 40:60. In this mixture of solvents, the solution of polyimide for formation of the nanofibres by electrospinning is prepared.

Figure 2:
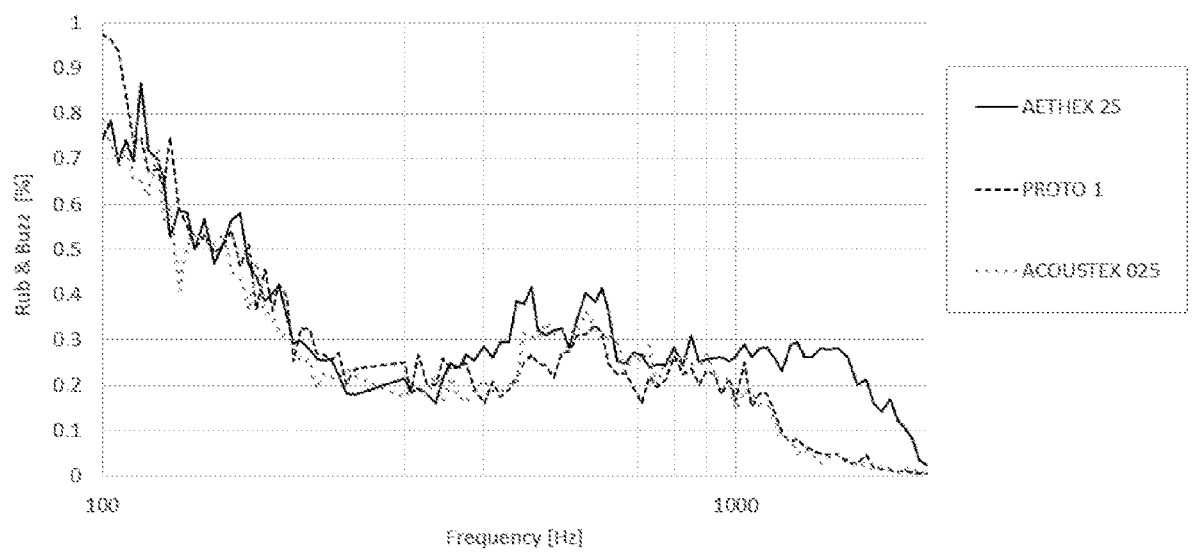

FIG. 2 is a graph illustrating a Rub&Buzz analysis of standard composite fabric (Aethex 25), PROTO1, and Acoustex 025 (Ac 025) fabric, where:

RUB&Buzz analysis is an analysis of an acoustic type on the undesired effects of irregular nonlinear distortion;

Aethex 25 is a composite fabric according to the prior art, not suited for withstanding high temperatures (nano-mesh with acoustic impedance of 25 MKS rayls);

PROTO 1 is the composite fabric according to the invention, also this having acoustic impedance of 25 MKS rayls;

Acoustex 025 is a non-composite fabric, i.e., without any nanofibre coating, also this having an acoustic impedance of 25 MKS rayls.

Figure 1:
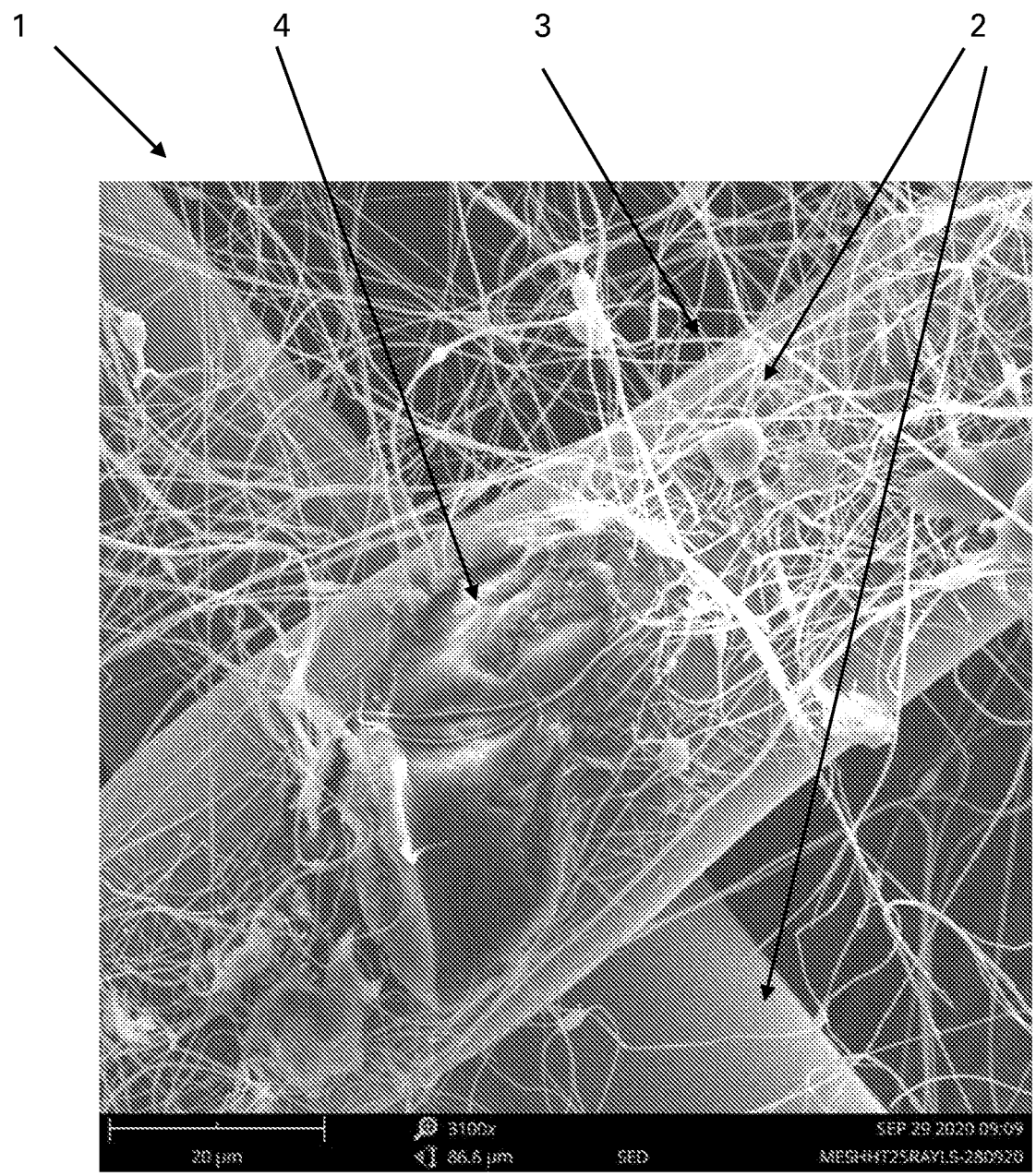
FIG. 1 shows a composite filtering medium according to the present invention, constituted by a PEEK 71.35 monofilament base fabric, i.e., a monofilament of polyether ether ketone with 71 threads of weft and warp in 1 cm of fabric and with a nominal diameter of 35 µm.
Figure 3:
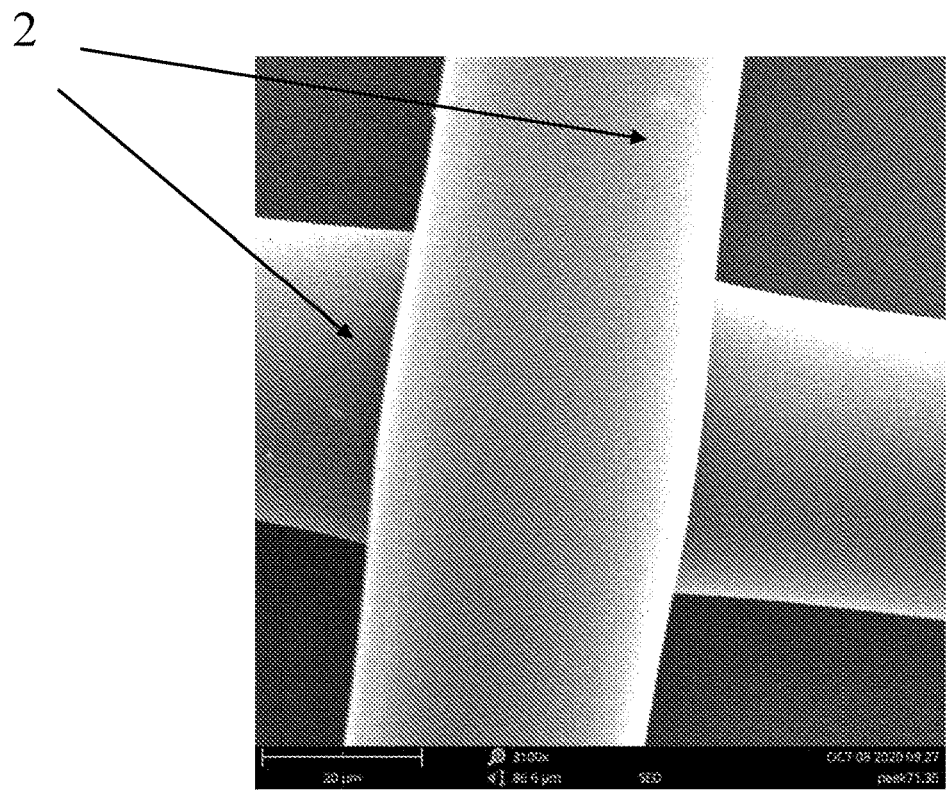

FIG. 3 shows a non-treated PEEK 71.35 base fabric, used in the preparation of the composite of FIG. 1.

Figure 4:
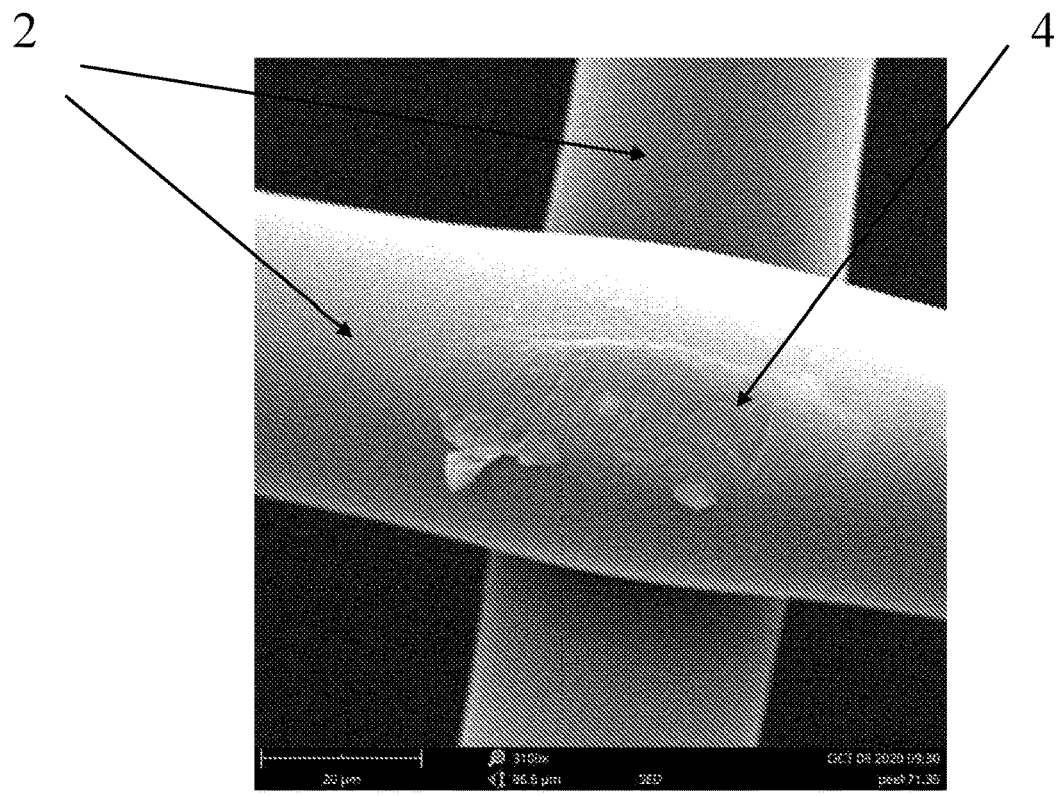

FIG. 4 illustrates the PEEK 71.35 base fabric of FIG. 3, with a view on the surface of the PEEK monofilaments of the base fabric during the electrospinning treatment with just the DMAc-NMP solvents in a weight percentage ratio of 40:60, without nanofibres.

Figure 5:
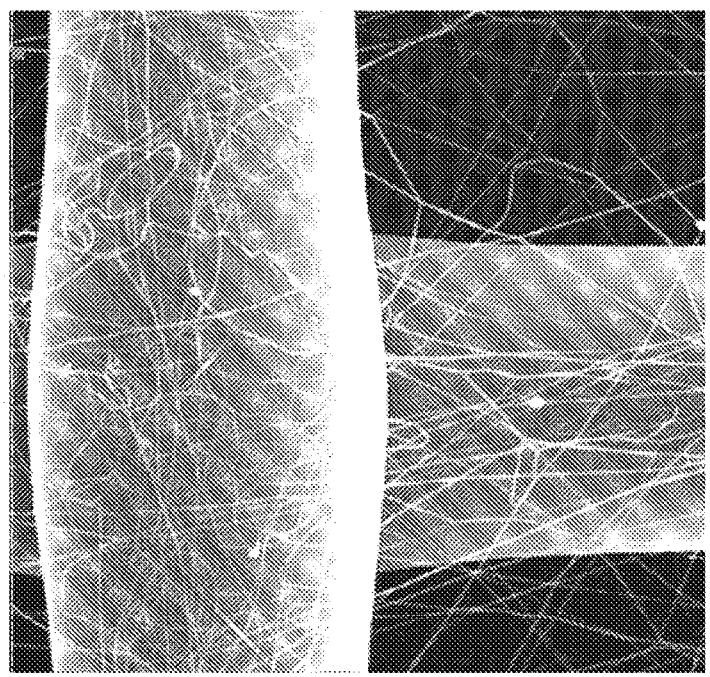

FIG. 5 illustrates a fabric according to the prior art on which, unlike the filtering medium according to the invention, no swelling is observed.

Figure 6:
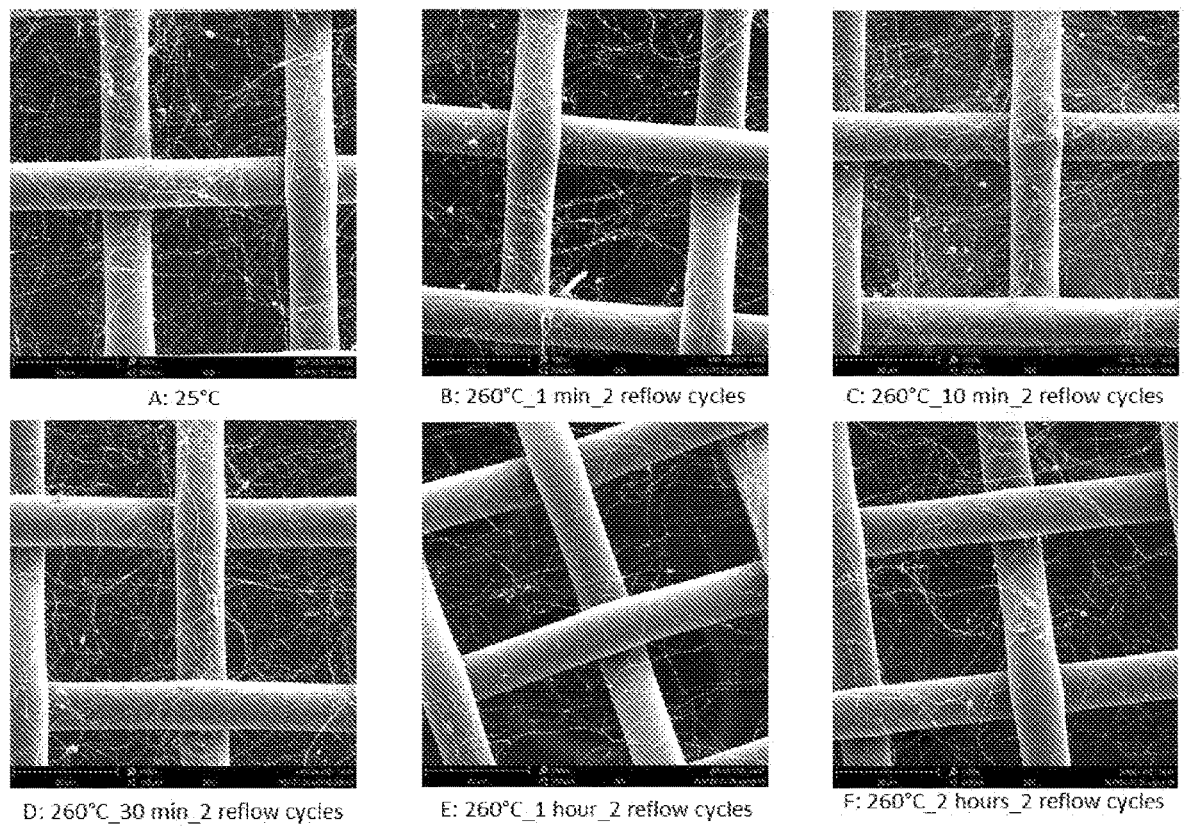

FIG. 6 illustrates the composite filtering medium of FIG. 1, with a view on the surface of the PEEK monofilaments of the base fabric during the electrospinning treatment with the DMAc-NMP solvents in a weight percentage ratio of 40:60 and with polyimide nanofibres, before (A) and after various cycles of thermal recycling (B-F), respectively, where:

B: 260° C._1 min_2 reflow cycles each;
C: 260° C._10 min_2 reflow cycles each;
D: 260° C._30 min_2 reflow cycles each;
E: 260° C._1 hour_2 reflow cycles each;
F: 260° C._2 hours_2 reflow cycles each.

Figure 7:
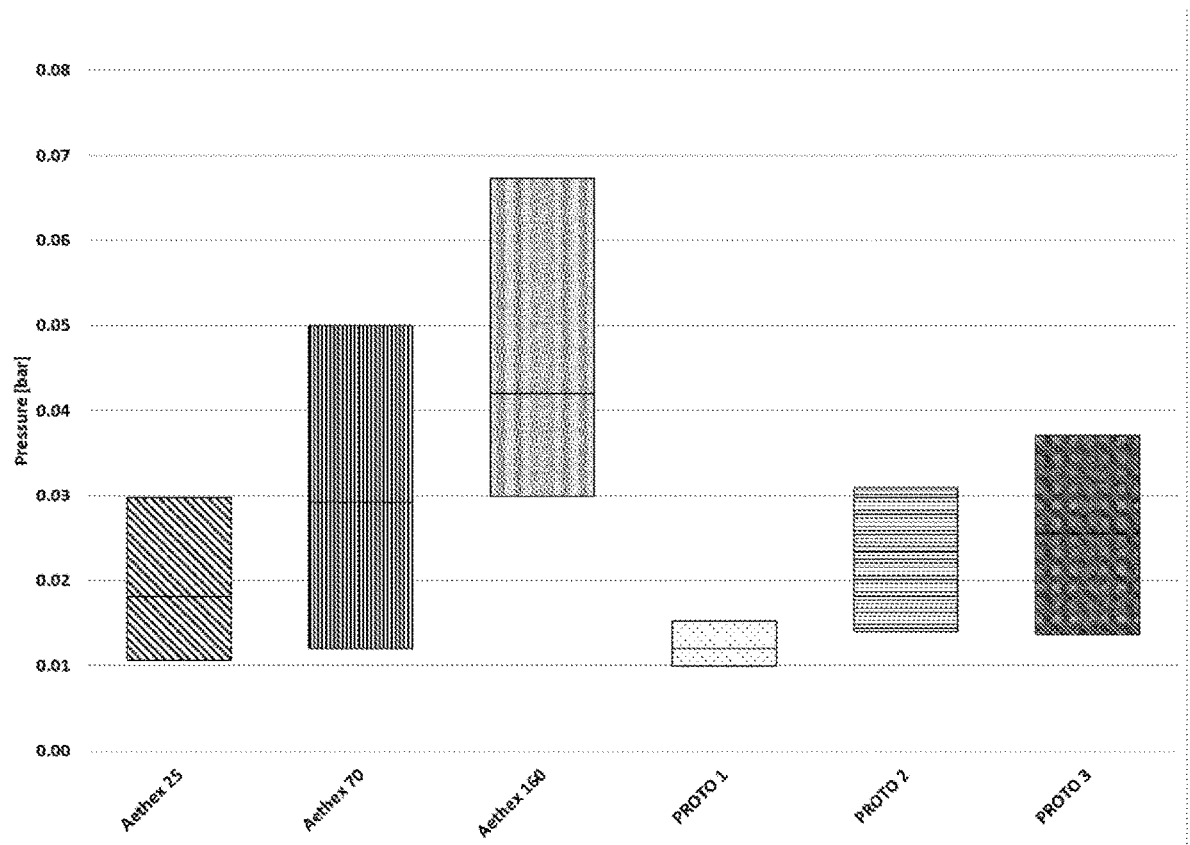

FIG. 7 compares the energy required for clearing completely from oil the composite fabrics according to the present invention, as compared to the energy required for filtering media according to the prior art having comparable properties of air permeability, where:

PROTO 1, 2, and 3 are composite fabrics according to the invention, having an air permeability of 4500, 2350, and 980 (l/m²s⁻¹) 200 Pa, respectively;

Aethex 25, 70, and 160 are filtering media according to the prior art, having an air permeability of 4500, 2350, and 980 (l/m²s⁻¹) 200 Pa, respectively.

DETAILED DESCRIPTION OF THE PREFERRED EMBODIMENTS

With particular reference to the numerals present in the aforesaid figures, the composite filtering medium 1 according to the invention comprises a fabric of the type with weft and warp, preferably PEEK threads or monofilaments 2, on the surface of which polyimide nanofibres 3 are deposited by electrospinning. According to the invention, the monofilaments 2 could be replaced by threads of a different type, formed by polymers suitable for withstanding high temperatures, such as fabrics made of glass fibre, polyparaphenylene sulphides, polyimides, polyether sulphones, and sulphonated polyarylether sulphones. The nanofibres themselves could moreover be made of materials different from polyimides and resistant to high temperatures, such as polybenzimidazoles, sulphonated polyether ether ketones, polyether sulphones, and sulphonated polyarylether sulphones.

Suitable for the invention are monofilaments and nanofibres characterized by good properties of thermal resistance, expressed in terms of melting temperature and/or glass transition temperature, with a thermal range from room temperature up to 300° C.

The base fabric used in the preparation of the composite filtering medium according to the invention is selected from a wide range of synthetic monofilament fabrics, with in general from 3 to 200 threads/cm, with a diameter from 24 to 600 µm and which differ in the chemical nature of the monofilament used for weaving.

Specifically, base fabrics capable of withstanding high process temperatures (up to 300° C.), both in one-step thermal processes and in thermal recycling or reflow processes, i.e. processes in which a number of consecutive cooling/heating cycles are present, are suitable for the invention.

For the finishing operations and further surface treatments it is possible to use metallization, washed and heat-set "white" fabric, coloured fabric, fabric subjected to plasma treatment, hydrophobic treatment, hydrophilic treatment, antibacterial treatment, antistatic treatment, and the like.

Preferred for the invention is a monofilament fabric made of polyether ether ketone (PEEK), with 71 threads/cm, a diameter of 35 µm, a mesh opening of the base fabric of 102 µm, a weave with a weight of 20 g/m², and a thickness of 65 µm.

Suitable for the invention are nanofibres of polymers capable of withstanding high process temperatures of up to 300° C., both in one-step thermal processes and in reflow cycles, with a diameter of the nanofibres comprised between 50 and 500 nm.

Preferred for the invention are polyimide (PI) nanofibres with a diameter of between 100 and 220 nm.

The electrospinning process for formation of the nanofibres and subsequent deposition thereof on the base fabric comprises injection of the material for formation of the nanofibres, dissolved in an appropriate solvent or mixture of solvents, through a nozzle in order to spread it on an electrode.

Thanks to the potential difference between the nozzle and the electrode, the nanofibres are formed as a result of evaporation of the solvent or mixture of solvents due to the electrical field and stretching of the polymer deposited on the electrode by means of the nozzle.

The nanofibres thus formed are then stretched and subsequently deposited on the base fabric.

Furthermore, the nanofibres 3 thus formed, in an innovative way as compared to the prior art, are not only deposited on the base fabric, but also firmly adhere thereto, without the aid of glues and/or adhesive agents applied on the base fabric and/or on the nanofibre layer, thanks to the use of some process parameters that will be clarified hereinafter, which favour a partial and surface swelling 4 of the threads 2 forming the base fabric.

This phenomenon of swelling 4 of the base threads 2, which does not affect the structural properties of the base fabric, favours a firm adhesion of the nanofibres 3 arranged on the base threads 2, enabling formation of a product that is more stable from the standpoint of integrity of adhesion between the base fabric and the nanofibres during the various machining processes to which the filtering medium is subjected.

According to the invention, this result is achieved by subjecting to an electrospinning process a solution of the polyimide for formation of the nanofibres 3 in a mixture of dimethyl acetamide (DMAc) and N-methyl-2-pyrrolidone (NMP) solvents, in excess of NMP. During the electrospinning process, polyimide nanofibres are thus obtained, which deposit on the threads 2 made of polyether ether ketone (PEEK). During this deposition step, the above-described solution of solvents, still carried by the nanofibres 3, moistens the threads 2 over their surfaces of contact with the nanofibres, thus forming on the surfaces themselves softened parts and swellings 4, which, in the electrospinning process, incorporate part of the nanofibres 3, thus contributing to their adhesion or their anchorage to the threads 2 (FIG. 1).

Consequently, according to the invention, during the electrospinning process not only are the nanofibres 3 deposited on the monofilaments 2, but also a phenomenon of adhesion or relative fixing between the threads and the nanofibres takes place, which contributes to the stability of the composite fabric 1. Suitable solvents for this purpose are mixtures of DMAc and NMP in a ratio of 40:60, with NMP present in excess, in particular in an amount greater than or equal to 50% by weight in the mixture of the solvents. Hence, in this way, adhesion of the nanofibres is favoured, without impairing the structural properties of the base fabric. FIGS. 1, 3, and 4 are SEM images that explain the phenomenon just described.

Table 1 provides a comparison of the properties of thermal resistance in terms of percentage variation of air permeability (A % of A.P.) before and after one or more reflow cycles between the filtering medium according to the invention and the filtering medium of to the prior art at different temperatures and with different times of use, specifically 130° C. for 120 hours (temperature and times of use commonly required for the filtering media according to the prior art); 260° C. for times ranging from 1 min to 2 hours (temperature and times of use commonly required for filtering media operating at high temperatures).

Specifically:

Aethex 25 is a composite fabric according to the prior art, not suited for withstanding high temperatures (nanomesh with acoustic impedance of 25 MKS rayls); and PROTO 1 is the composite fabric according to the invention, formed by the PEEK 71.35 base fabric with coating of polyimide nanofibres, obtained by electrospinning of a solution of polyimide in DMAc/NMP in a ratio of 40:60, also this having acoustic impedance of 25 MKS rayls.

Table 1 then provides a comparison of the percentage difference of air permeability, measured before and after one or more reflow cycles from 25° C. to 130° C. and from 25° C. to 260° C., between the filtering medium according to the invention PROTO 1 and the filtering medium according to the prior art Aethex 25. Air permeability is measured in $l/m^2s^{-1}$ at an air pressure of 200 Pa.

From this table it emerges that the filtering medium according to the invention has the same filtering capacity as the filtering medium according to the prior art in the thermal range 25-130° C. and in the typical times of use of the latter and that only the filtering medium according to the invention can be used at high temperatures, for different times, and in a number of reflow cycles. For this reason, the data measured at 260° C. are not available for the composite fabric Aethex 25 as they are not measurable. It is known that an indication of damage to a filtering medium during or after its use is an increased or decreased air permeability thereof as compared to its initial state of non-use, in a percentage of tolerance higher than the physiological one of the process, which in general is deemed acceptable within 8%, since this behaviour implies possible damage to the morphology of the filtering medium occurred during its use. Instead, variations of air permeability in excess or in defect with respect to its initial state of non-use comprised in the range of tolerance of the process itself are an indication of an unaltered capacity of protection of the filtering medium during its use. In the specific case, there may be noted a reduction in the air permeability of the filtering medium comprised in the range of tolerance of the process, i.e., lower than 5%, confirming the filtering capacity of the composite medium according to the present invention.

TABLE 1

| Properties | Prior art Aethex 25 | Invention PROTO 1 |
|---|---|---|
| Δ % of A.P. after 1 reflow cycle from 25° C. to 130° C. for 120 hours | +1.2 | +1.8 |
| Δ % of A.P. after 1 reflow cycle from 25° C. to 260° C. for 1 min | N.A. | −1.6 |
| Δ % of A.P. after 2 reflow cycles from 25° C. to 260° C. for 1 min each | N.A. | −4.1 |
| Δ % of A.P. after 1 reflow cycle from 25° C. to 260° C. for 10 min | N.A. | −0.1 |
| Δ % of A.P. after 2 reflow cycles from 25° C. to 260° C. for 10 min each | N.A. | −1.6 |
| Δ % of A.P. after 1 reflow cycle from 25° C. to 260° C. for 30 min | N.A. | −1.7 |
| Δ % of A.P. after 2 reflow cycles from 25° C. to 260° C. for 30 min each | N.A. | −2.6 |
| Δ % of A.P. after 1 reflow cycle from 25° C. to 260° C. for 1 hour | N.A. | −0.4 |
| Δ % of A.P. after 1 reflow cycle from 25° C. to 260° C. for 1 hour each | N.A. | −3.5 |

TABLE 1-continued

| Properties | Prior art Aethex 25 | Invention PROTO 1 |
|---|---|---|
| Δ % of A.P. after 1 reflow cycle from 25° C. to 260° C. for 2 hours | N.A. | −0.5 |
| Δ % of A.P. after 1 reflow cycle from 25° C. to 260° C. for 2 hours each | N.A. | −1.0 |

N.A. = Not Acquired

FIG. 6 illustrates the composite filtering medium according to the present invention, with a view on the surface of the PEEK monofilaments of the base fabric in the electrospinning treatment with the DMAc-NMP solvents in a weight percentage ratio of 40:60 and with polyimide nanofibres, before (A) and after various thermal recycling cycles (B-F), where specifically:

B: 260° C._1 min_2 reflow cycles each;
C: 260° C._10 min_2 reflow cycles each;
D: 260° C._30 min_2 reflow cycles each;
E: 260° C._1 hour_2 reflow cycles each;
F: 260° C._2 hours_2 reflow cycles each.

From the images presented it may be noted that in all the study cases of thermal recycling from B to F, the morphological appearance of the filtering medium according to the invention, understood as homogeneity of coating of the meshes and adhesion of the polyimide nanofibres to the PEEK fabric, thanks to the formation of swellings on the surface of the fabric itself described previously, remains unaltered as compared to the morphological appearance that the filtering medium itself had prior to its use, confirming the thermal resistance of the filtering medium according to the present invention in regard to the thermal-recycling tests performed.

The following Table 2 shows the properties of air permeability, pore size, and acoustic impedance of various prototypes of filtering media according to this invention, in comparison with the corresponding properties of the PEEK 71.35 base fabric alone, i.e., without nanofibre coating.

In this table, the pore is that of the fabric, made up of the combination of the pores present on the base fabric and of the pores formed on the nanofibre coating. Air permeability is measured in $l/m^2s^{-1}$ at an air pressure of 200 Pa.

Moreover:
PEEK 71.35 is the base fabric according to the invention, having 71 threads/cm, a diameter of 35 μm, a mesh opening of the base fabric of 102 μm, a weave with a weight of 20 g/m², and a thickness of 65 μm;
PROTO 1 is the composite fabric according to the invention, formed by the PEEK 71.35 base fabric with coating of polyimide nanofibres, obtained by electrospinning of a solution of polyimide in DMAc/NMP in a ratio of 40/60;
PROTO 2-5 are the composite fabrics according to the invention, similar to PROTO 1 and obtained with different parameters of the electrospinning process.

TABLE 2

| Properties | PEEK 71.35 | PROTO 1 | PROTO 2 | PROTO 3 | PROTO 4 | PROTO 5 |
|---|---|---|---|---|---|---|
| Air permeability (l/m²s⁻¹) 200 Pa | 12050 | 4580 | 2350 | 980 | 450 | 140 |
| Pore size (μm) | 65 | 36 | 19 | 5 | 2 | 1 |
| Acoustic impedance (Rayls) | 6 | 25 | 70 | 200 | 440 | 1400 |

Table 2. Properties of air permeability and pore size of the base fabric and of some prototypes of the filtering medium according to the present invention.

From Table 2 above it may be noted that, in terms of air permeability, in the electrospinning process used in the preparation of PROTO 1 to 5 according to the invention, the meshes of PEEK fabric are coated in a progressively increasing way with nanofibres, thus obtaining decreasing pore sizes and increasing acoustic impedances.

The following Table 3, instead, shows the properties of air permeability of standard fabrics, where present, having pore sizes comparable with those of the various prototypes according to the present invention, where:

PES 38/20, PES 15/09 is polyester with a mesh opening of 38 and 15 µm, respectively, and 20% and 9% of free surface in 1 cm² of fabric, respectively.

TABLE 3

| Filtering medium | Fabric with same pore size without nanofibre coating | Air permeability of the fabric ($l/m^2s^{-1}$) 200 Pa | Pore diameter (µm) PROTO | Air permeability of PROTO ($l/m^2s^{-1}$) 200 Pa |
|---|---|---|---|---|
| PROTO 1 | PES 38/20 | 2225 | 36 | 4580 |
| PROTO 2 | PES 15/09 | 375 | 19 | 2350 |
| PROTO 3 | N.A. | N.A. | 5 | 980 |
| PROTO 4 | N.A. | N.A. | 2 | 450 |

N.A. = Not Acquired

Table 3. Properties of air permeability and pore size of the base fabric and of some prototypes of the filtering medium according to the present invention.

Table 3 highlights that, with comparable pore size, in the case of PROTO 1 and 2 there is an air permeability much greater than in the case of the fabric, thus ensuring a better acoustic behaviour. Instead, since no standard reference fabric is available for the comparison with PROTO 3 and PROTO 4, it is evident how only the composite fabric according to the present invention can ensure the described properties of air permeability and protection against particulate.

Finally, a further object of the invention is to provide a new composite fabric with filtering action for electro-acoustic components that, in addition to being able to withstand temperatures of even up to 300° C., has a filtering performance that is equivalent to or higher than that of composite fabrics of the prior art.

In the case under examination, different prototypes have been prepared having the same air permeability as that of composite fabrics according to the prior art, and, given the same properties of air filtering, filtering media have been obtained with pore sizes comparable to or smaller than those of the corresponding composite fabrics according to the prior art.

By adding a plasma treatment to the filtering medium according to the present invention, in combination with the use of polyimide nanofibres 3, in addition to increasing the water-column resistance already known in the case of the filtering media belonging to the prior art, the energy required for removing the oil deposited on the surface of the filtering medium has been drastically reduced as compared to that required by the filtering media according to the known technology, thus obtaining a better protective performance than the latter's.

Appearing in FIG. 7 are the pressures required for removing completely the oil deposited on the surface of the filtering media according to the prior art and according to the present invention, which have an air permeability comparable with that of the various prototypes according to the present invention.

In FIG. 7:

Aethex 25 and PROTO 1 are, a composite fabric according to the prior art and a composite fabric according to the present invention, respectively, which have a pore size of 60 and 36 µm, respectively, and a permeability of approximately 4500 ($l/m^2s^{-1}$) 200 Pa;

Aethex 70 and PROTO 2 are a composite fabric according to the prior art and a composite fabric according to the present invention, respectively, which have a pore size of 12 and 19 µm, respectively, and a permeability of approximately 2350 ($l/m^2s^{-1}$) 200 Pa;

Aethex 160 and PROTO 3 are a composite fabric according to the prior art and a composite fabric according to the present invention, respectively, which have a pore size of 14 and 5 µm, respectively, and a permeability of approximately 980 ($l/m^2s^{-1}$) 200 Pa.

From FIG. 7 it emerges in particular that the pressure required for clearing completely the oil from the composite fabric is lower for the composite fabrics according to the invention than for those of the prior art, which renders cleaning of the fabric simpler and faster.

The present invention has a wide range of advantageous applications.

An example of practical application of the present invention regards filtering, even at a high temperature.

As compared to the nanomesh of a conventional type, the filtering medium made of PEEK and polyimide can be used also in several other applications; for example, it can be used in applications where the filtering medium will be subjected to high process temperatures, and it is necessary for its properties to remain unaltered, i.e., for the fabric and the nanofibres not to undergo any modification due to temperature.

An innovative application of the filtering medium according to the present invention regards MEMS (Micro Electro-Mechanical Systems) technology.

Specifically, MEMS devices are characterized by two vent ports, one internal to the MEMS device, which involves the use of a protective filtering medium not necessarily post-treated via die cutting, and one external to the device itself, which involves the use of a protective filtering medium necessarily post-treated using die-cutting means, which allows problems of overheating and equalization of the pressure of the electronic components to be overcome during their use.

This makes it possible to withstand, in the various steps of assembly and use, very high process temperatures, even close to 300° C., favouring the passage of air between the inside and the outside of the MEMS devices.

The need to protect both of these vents with protective membranes permeable to air and resistant to high temperatures, close to 300° C., is fundamental for preventing contamination by humidity, particulate, dust, oil, etc., and more in general for preventing reduction in sound transmission performance, for enabling recirculation of air flows, and finally, since they are resistant to high temperatures, for favouring assembly of the MEMS devices previously integrated with protective layers, a technical choice that facilitates and renders more economic the production of a MEMS device, which, if assembled without protection of the vents, can undergo damage during the assembly process.

In the current state of the art, the protection of the internal and external vents of the MEMS devices is implemented in two ways: i) either by not applying any protective layer, with consequent very short service life of the device; ii) or else by applying protective adhesive tapes.

The choice of the application of a protective adhesive tape cannot be considered satisfactory as compared to non-protection of the vent port itself, as these tapes are not permeable to air, and hence, albeit protecting the device from several contaminants, do not enable an adequate recirculation of air, with consequent problems of overheating and non-equalization of the pressure inside the MEMS.

Hence, the use of a filtering medium made with a nanomesh of a known type, with the added advantage of thermal resistance according to the present invention, represents an advance with respect to the current state of the art of MEMS technology, both for internal protection and for external protection of MEMS devices.

In acoustic applications, the invention can be used in those situations where the filtering medium is co-moulded with high-melting polymers, thus ensuring a thermal resistance during the process.

In addition to the use in applications involving high temperatures where the conventional nanomesh could not be used for evident physical limits, the second advantage of the present invention lies in the improved and intimate adhesion between the supporting fabric and the nanofibres.

In this case, in fact, this property enables:
post-processing of the material, thus preventing damage thereto and hence possible worsening of the performance (see typical die-cutting process for providing packaged nanomesh parts assembled with layers of adhesives);
a major advantage in terms of acoustic properties; in the case, in fact, of non-firm adhesion between the nanofibres and the standard fabric, the passage of sound, i.e., of an air flow at given rates, could lead to possible microvibrations of the nanofibre layer on the substrate, causing distortion of the sound or undesired noise.

With firm adhesion of the nanofibres to the substrate the vibrational problem just described disappears, and hence the sound is cleaner.

Typically, it is possible to study the distortion of the sound or the onset of undesired noise caused by microvibrations induced by the nanofibre layer electrospun on the substrate through acoustic analyses referred to as "Rub&Buzz".

FIG. 2 shows a graph with the Rub&Buzz analyses for a standard nanomesh specimen (Aethex 25), a specimen of PROTO 1, i.e., the filtering medium according to the present invention, and a specimen of fabric Acoustex 025 having the same acoustic impedance as Aethex 25 and PROTO1.

From the graph appearing in FIG. 2 it may in general be noted that for all the specimens measured, Aethex 25, PROTO 1, Acoustex 025, the percentage of vibration induced by the filtering medium is below 0.8% (reference target for commercial acoustic devices).

Moreover, by comparing PROTO 1 with the two reference specimens, lower and consequently improved percentage values of Rub&Buzz may be noted for all the specimens PROTO 1 as compared to Aethex 25 and Acoustex 025, thanks to a better adhesion of the nanofibre layer on the base fabric.

It is to be pointed out that it is possible to add a plasma treatment to the filtering medium according to the present invention, thus achieving benefits on two fronts:
in the case of a material that is not particularly permeable, there is an increase in the water-column resistance; and in the case of a very permeable material, the non-wettability of the nanomesh is ensured.

Moreover, with plasma treatment, the energy required for removing the oil deposited on the surface of the filtering medium is reduced.

It has in practice been found that the invention achieves the intended aim and objects.

A filtering medium has in fact been obtained constituted by a material made up of polymeric nanofibres deposited via electrospinning on a monofilament fabric.

During deposition the nanofibres are arranged on the threads, on the crossings between them and in the meshes of the fabric; being arranged in the meshes, they reduce the mean aperture and the free surface of the fabric.

In this way, it is possible to obtain values of air permeability and acoustic impedance equal to those of standard fabrics.

At an equal value of permeability/impedance the composite fabric provides a protection against intrusion of dust (metal dust, textile dust, etc.) that is better than that of a standard fabric.

This is due to the random and three-dimensional structure of the nanofibre layer of arranged in the meshes, which makes it possible to reduce the surface of passage, unlike the fabric that employs only its own mesh opening to reduce and/or prevent passage of dust. Thanks to the nanoscale size of the fibres, it is moreover possible to minimize the percentage of closed or non-filtering volume.

In this way, by replacing with the composite fabric a standard fabric with equal permeability in a given application, it is, in fact, possible to guarantee the same pressure drop given the same flow that passes through, thus considerably improving protection against intrusion.

In the specific case of use of the composite fabric as protective medium for electro-acoustic components in the consumer-electronics field (speakers, receivers, microphones) it is thus possible to guarantee the same acoustic performance as compared to a fabric traditionally used but with an improved protective capacity. In certain cases it is even possible to obtain at the same time a better acoustic performance and better characteristics of protection from particulate intrusion.

The invention claimed is:
1. A method for producing a composite filtering medium comprising a base fabric, of the type with weft and warp of threads or monofilaments of polyether ether ketone and a nanofibre layer comprising nanofibres of polyimide deposited on the base fabric, wherein the method comprises:
forming a solution by dissolving polyimide in a solvent mixture comprising dimethyl acetamide and N-methyl-2-pyrrolidone with N-methyl-2-pyrrolidone comprising an amount greater than or equal to 50% by weight in the solvent mixture,
applying a difference of potential between a nozzle and the base fabric and
injecting the solution through the nozzle to form the nanofibres and to spread the nanofibres on the base fabric, with the nanofibres contacting the threads or monofilaments at surfaces of contact of the threads or monofilaments,
wherein the nanofibres are formed as a result of evaporation of the mixture of solvents, an electrical field created by the difference of potential, and stretching of the nanofibres deposited on the base fabric,
wherein swellings of the threads or monofilaments are formed on the surfaces of contact when the nanofibers are spread on the base fabric, wherein the nanofibres adhere to the base fabric at the swellings without the aid of glues or adhesive agents applied to the base fabric or the nanofibre layer.

2. A composite filtering medium, obtained with the process of claim 1, characterized in that said threads or monofilaments have, on their surfaces of contact with said nanofibres, the swellings that incorporate the nanofibres themselves, holding them on the surface of the threads or monofilaments themselves.

3. The composite filtering medium according to claim 2, characterized in that the base fabric is subjected to metallization, and an additional surface treatment selected from the group consisting of washed and thermoset to produce a white fabric, colouring, plasma treatment, hydrophobic treatment, hydrophilic treatment, antibacterial treatment, or antistatic treatment.

4. The composite filtering medium according to claim 2 characterized in that said base fabric has a mesh opening of 102 μm, a weave with a weight of 20 g/m$^2$, and a thickness of 65 μm.

5. The composite filtering medium according to claim 2, characterized in that said nanofibres have a diameter of between 100 and 200 nm.

* * * * *